March 10, 1925.
B. L. VAN ORMAN
1,528,998
AUTOMATIC MACHINE CONTROL MEANS
Filed Oct. 15, 1923
5 Sheets-Sheet 1
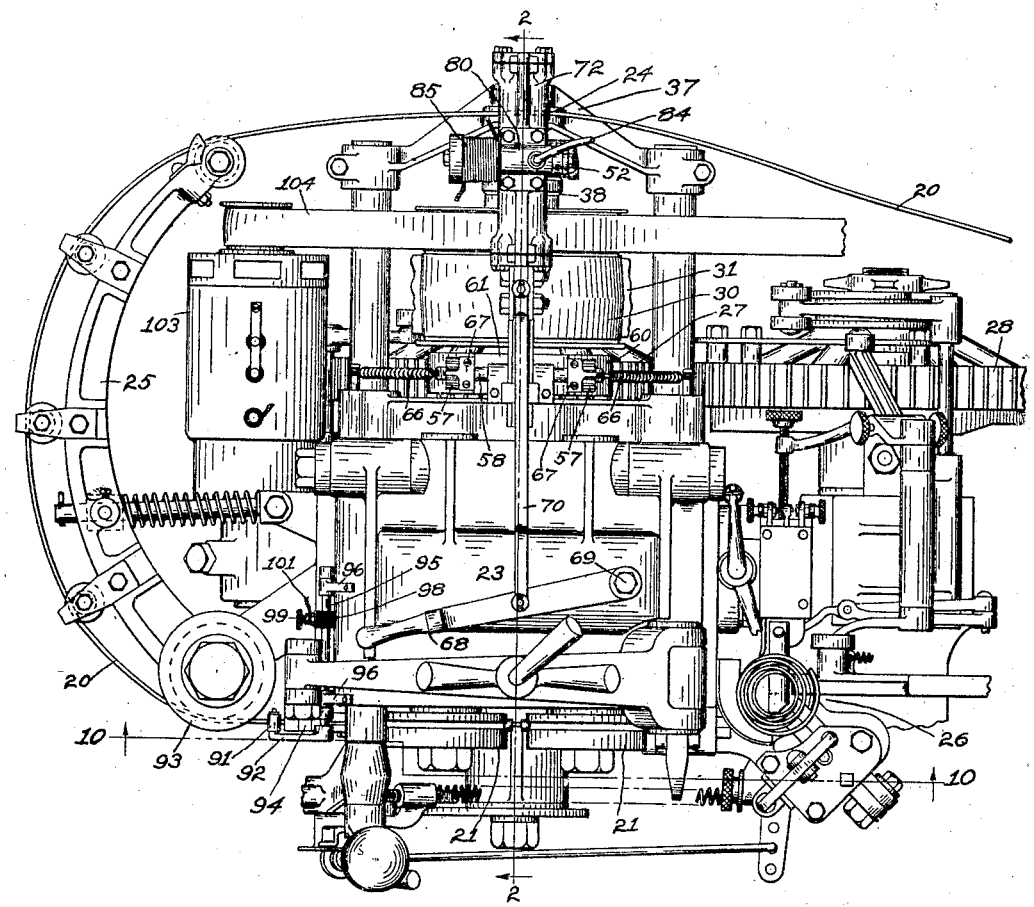
Fig. I
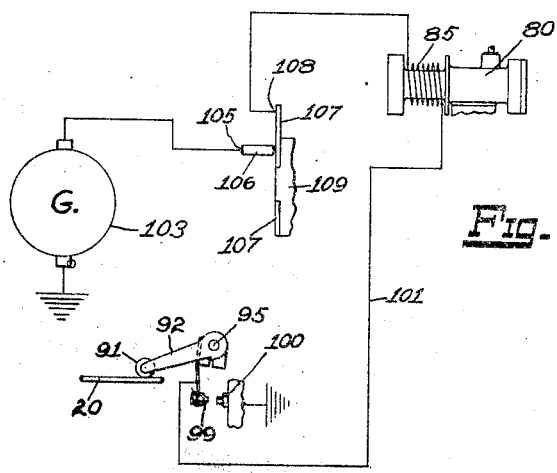
Fig. XV
INVENTOR.
Bert L. Van Orman
BY Chappell Earl
ATTORNEYS March 10, 1925.     1,528,998
B. L. VAN ORMAN
AUTOMATIC MACHINE CONTROL MEANS
Filed Oct. 15, 1923    5 Sheets-Sheet 2
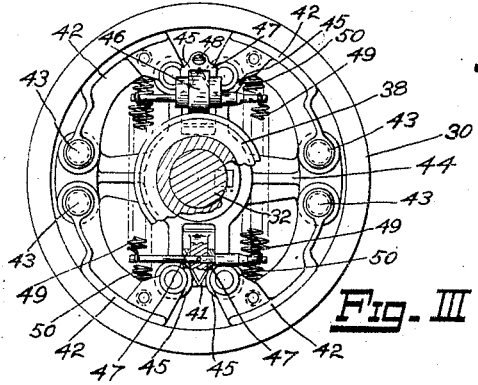
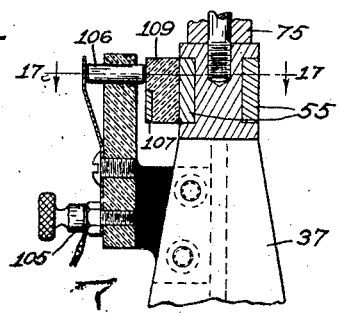
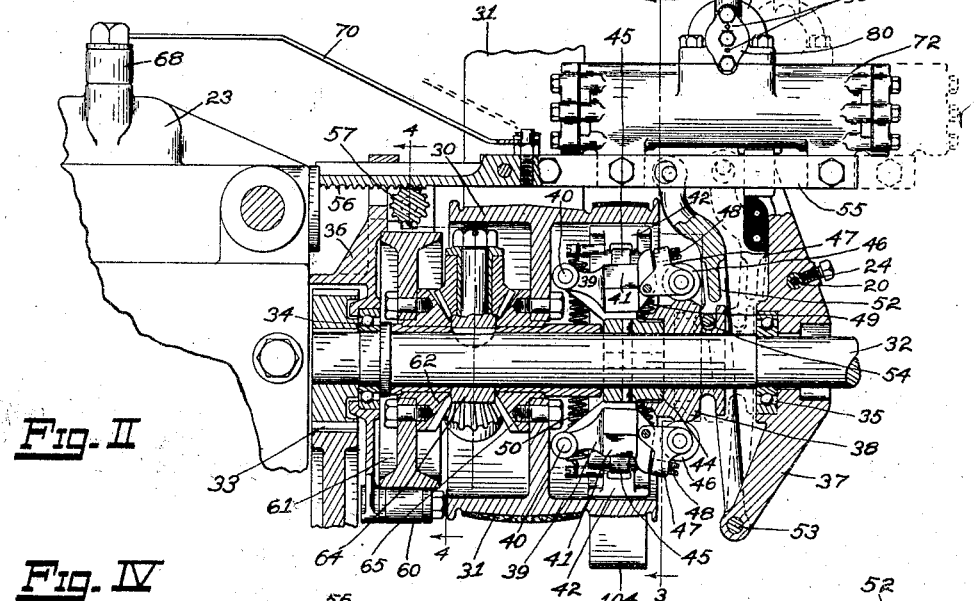
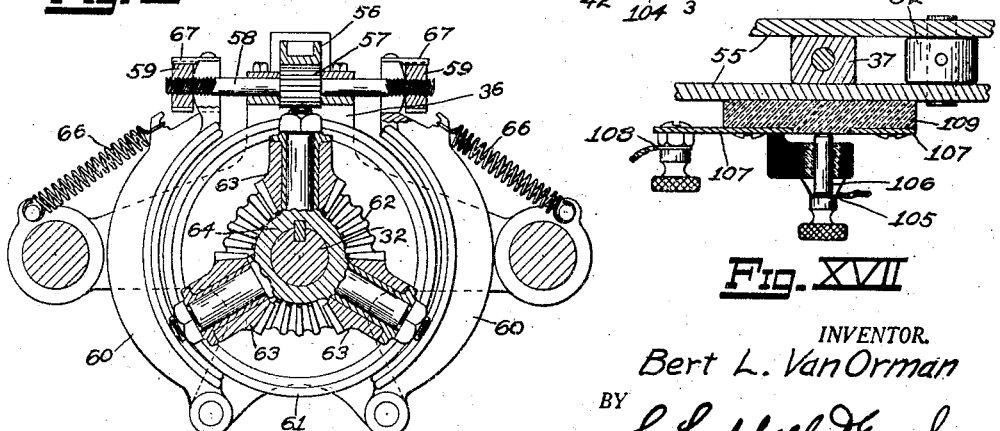
INVENTOR.
Bert L. Van Orman
BY
Chappell Earl
ATTORNEYS

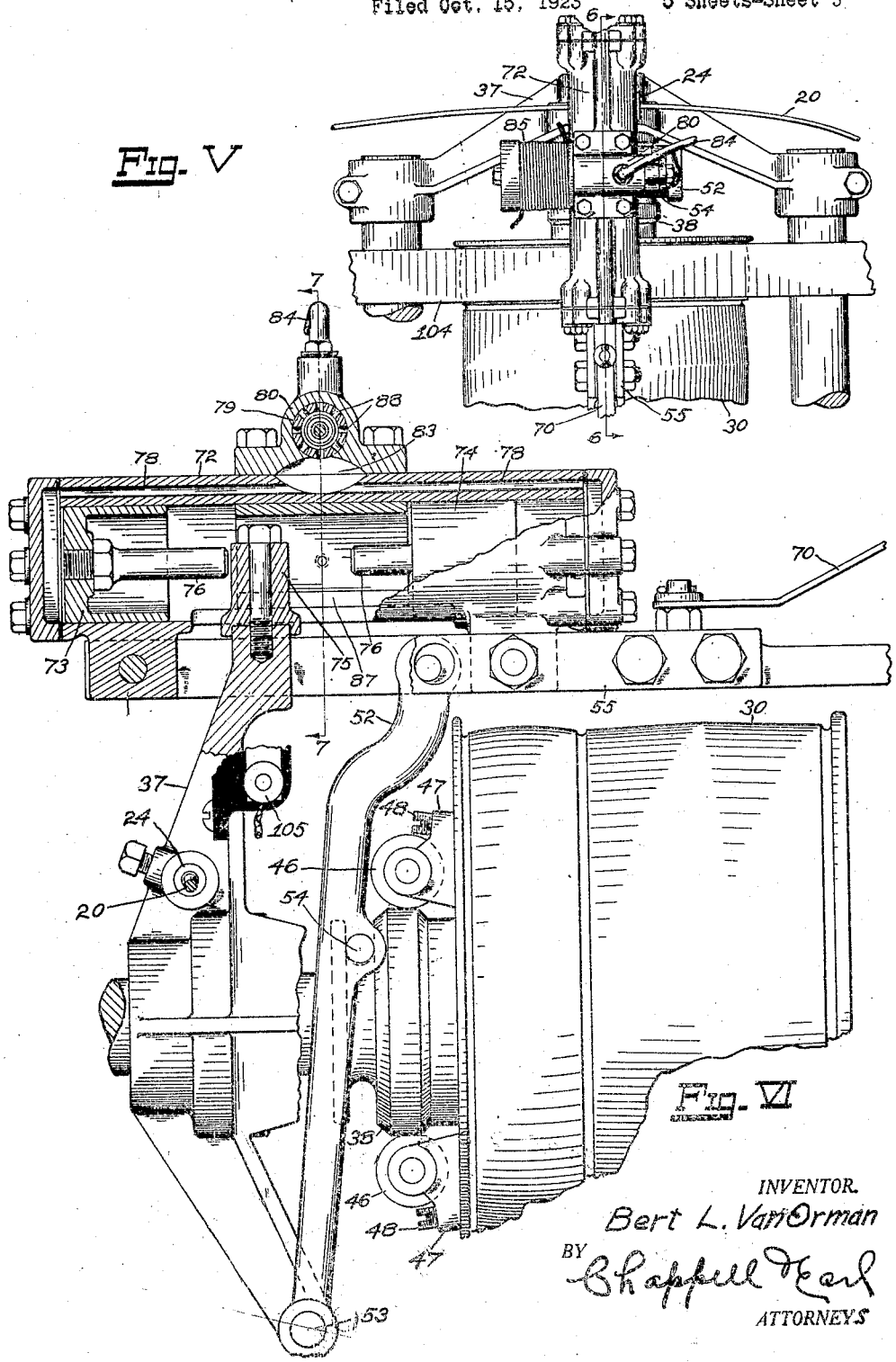

March 10, 1925.
B. L. VAN ORMAN
AUTOMATIC MACHINE CONTROL MEANS
Filed Oct. 15, 1923   5 Sheets-Sheet 4
1,528,998
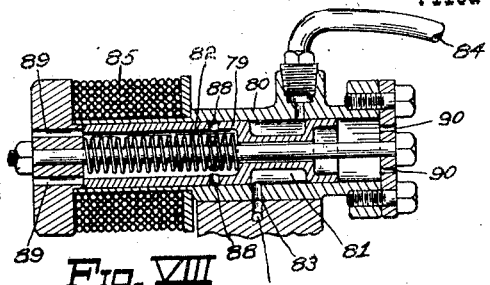
Fig. VIII
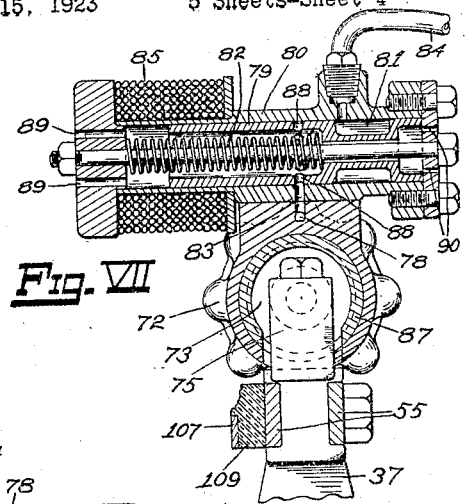
Fig. VII
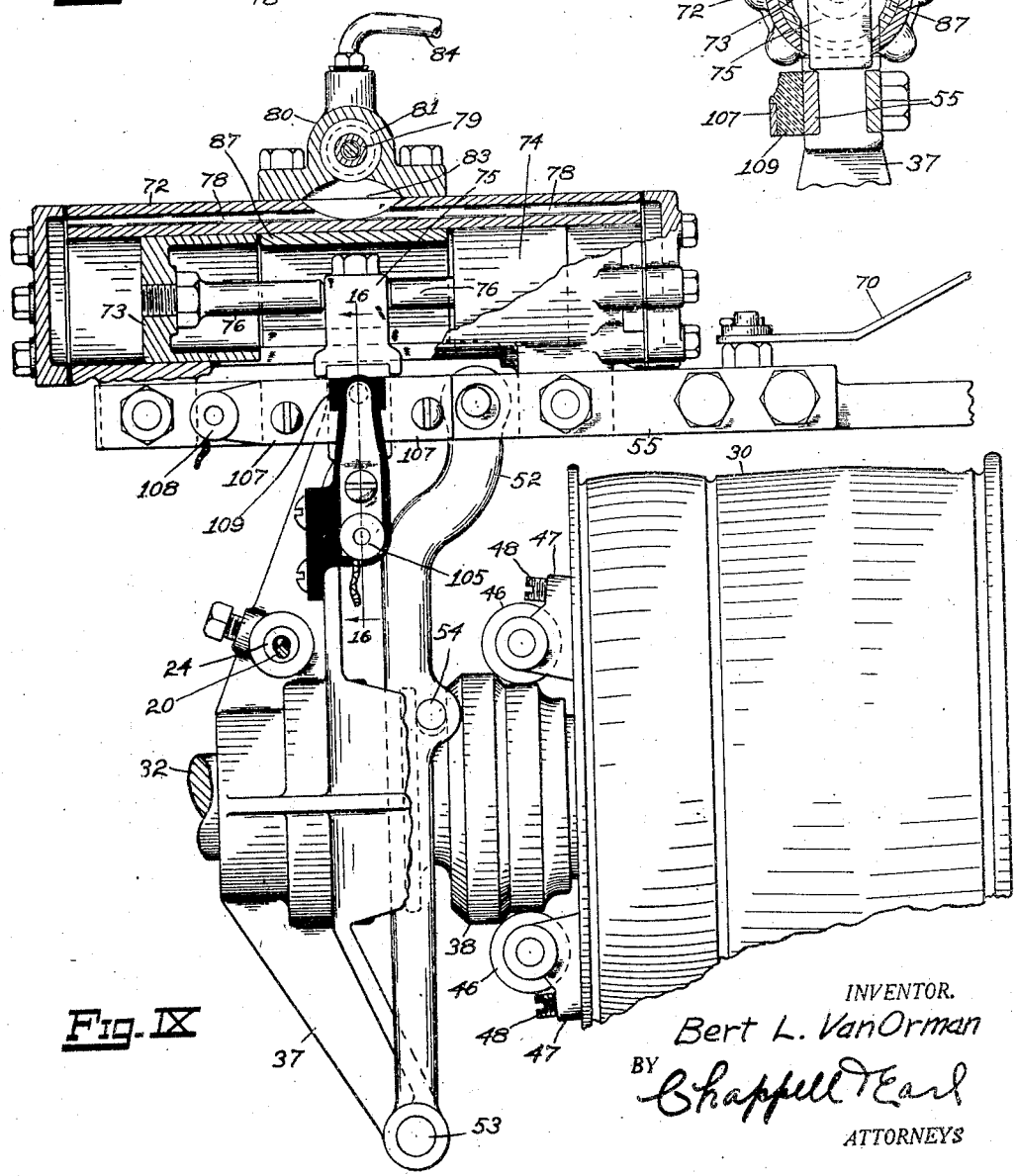
Fig. IX
INVENTOR.
Bert L. Van Orman
BY Chappell Earl
ATTORNEYS

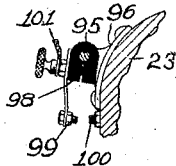
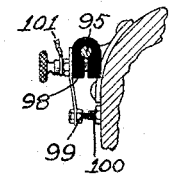
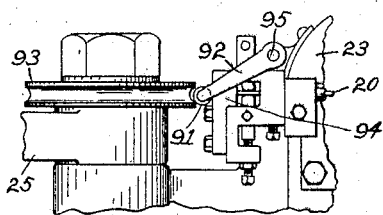
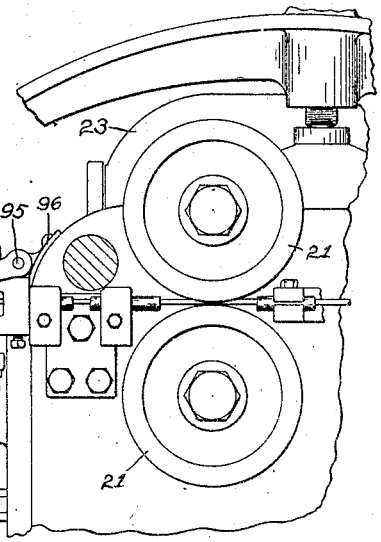
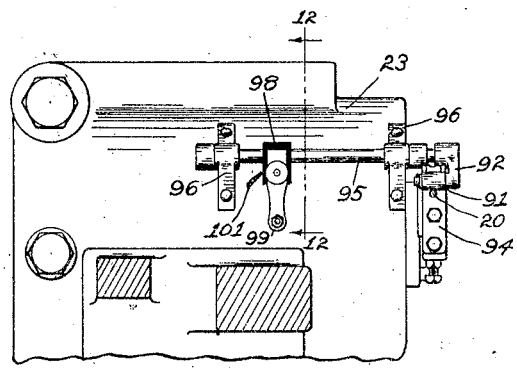

Patented Mar. 10, 1925.

1,528,998

UNITED STATES PATENT OFFICE.

BERT L. VAN ORMAN, OF HIGHLAND PARK, MICHIGAN, ASSIGNOR TO L. A. YOUNG INDUSTRIES, INC., OF DETROIT, MICHIGAN.

AUTOMATIC MACHINE-CONTROL MEANS.

Application filed October 15, 1923. Serial No. 668,676.

*To all whom it may concern:*

Be it known that I, BERT L. VAN ORMAN, a citizen of the United States, residing at Highland Park, county of Wayne, State of Michigan, have invented certain new and useful Improvements in Automatic Machine-Control Means, of which the following is a specification.

This invention relates to automatic machine control means actuated by abnormal conditions to automatically disconnect the machine from its source of power.

In the accompanying drawing I have shown my invention as I have adapted the same to the manufacture of coiled springs such as are used in the upholstering of vehicle seats, furniture and the like, the general construction and operation of such machine being that of my co-opending application, Serial No. 474,399, filed June 2, 1921.

In the accompanying drawing I have shown only such parts of the machine as I deem necessary to illustrate a practical adaptation or embodiment of my invention.

In my co-pending application for Letters Patent Serial No. 595,995, filed October 21, 1922, I illustrate an automatic machine control means having certain features in common with the mechanism of my present application.

The main objects of this invention are:

First, to provide in a machine of the class described a means for automatically stopping the machine in the event of failure of a part to perform its normal function, thereby reducing the liability of injury to the machine.

Second, to provide an improved automatic control mechanism of the class described which is positive in its operation and not likely to get out of repair or become inoperative through wear.

Third, to provide an improved automatic machine control mechanism which is comparatively simple and compact in structure.

Further objects, and objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this application, in which:

Fig. I is fragmentary plan view of a machine embodying the features of my invention.

Fig. II, Sheet 2, is an enlarged detail view in section on a line corresponding to line 2—2 of Fig. I illustrating details of change speed power transmitting mechanism with manual and automatic controlling means.

Fig. III, Sheet 2, is a detail section on a line corresponding to line 3—3 of Fig. II showing details of the high speed clutch.

Fig. IV, Sheet 2, is a detail section on a line corresponding to line 4—4 of Fig. II, showing details of the low speed clutch.

Fig. V, Sheet 3, is an enlarged fragmentary plan view of a portion of Fig. I.

Fig. VI, Sheet 3, is an enlarged detail section on a line corresponding to line 6—6 of Fig. V, showing details of the automatic neutralizing means with the transmission in high speed.

Fig. VII, Sheet 4, is a detail section on a line corresponding to line 7—7 of Fig. VI, illustrating details of an electrically actuated control valve in closed position.

Fig. VIII, Sheet 4, is a detail section similar to Fig. VII, showing the transmission control mechanism in neutral position.

Fig. IX, Sheet 4, is a detail section similar to Fig. VI, showing the transmission control mechanism in neutral position.

Fig. X, Sheet 5, is an enlarged detail section on a line corresponding to line 10—10 of Fig. I, illustrating the means for automatically closing an electrical circuit, the parts being shown in open position.

Fig. XI, Sheet 5, is a detail section on a line corresponding to line 11—11 of Fig. X, illustrating further details of the circuit closing means.

Fig. XII, Sheet 5, is a detail section on a line corresponding to line 12—12 of Fig. XI.

Fig. XIII, Sheet 5, is a fragmentary view of portions showing the circuit closing means in closed position.

Fig. XIV, Sheet 5, is a detail view corresponding to Fig. XII with the parts in closed position.

Fig. XV, Sheet 1, is a diagrammatic view of the electrical circuit for controlling the clutch releasing means.

Fig. XVI, Sheet 2, is a detail section on a line corresponding to line 16—16 of Fig. IX showing details of the automatic circuit breaking means.

Fig. XVII, Sheet 2, is a view in section on a line corresponding to line 17—17 of Fig. XVI.

In the drawing similar reference numerals refer to similar parts throughout the several views and the sectional views are taken looking in the direction indicated by the little arrows at the ends of the section lines.

Since the operation of the machine is described in my said applications referred to, I deem it sufficient for a full understanding of my present improvements to give a general description of the operation of parts directly associated with my present invention.

The stock wire 20 from which the springs are manufactured by the machine, is drawn from a suitable source of supply by feed rollers 21 which are driven by suitable reduction gearing enclosed in the gear housing 23 (see Fig. I). The wire is pulled through a guide 24 and around a tension arm 25, and is delivered to coiling mechanism designated generally by the numeral 26. The counter gears 27 and 28 distribute motion to various parts of the machine.

Power from any suitable source imparts motion to a main drive pulley 30 by means of a belt 31. The pulley revolves at a constant and uniform speed, but through the medium of a transmission the machine may be driven at either of two different speeds or may be disconnected from the drive pulley. The construction of a preferred type of transmission is illustrated in Figs. II, III and IV.

A driven shaft 32 which is operatively connected with working parts of the machine by a suitable train of gears 33 serves as a support for the drive pulley 30 and other revolving parts of the transmission. The shaft 32 is rotatable in suitable bearings 34 and 35 in the supporting brackets 36 and 37 (see Fig. II). When the transmission is in neutral, the pulley is free to rotate on the shaft 32 while the latter remains at rest.

When the parts are in the positions shown in Figs. II and VI, the cone 38 which is free to slide endwise on the driven shaft is in position to spread apart the levers 39 pivoted at 40, causing the wedges 41 to spread and expand the clutch shoes 42 into frictional engagement with the inside surface of the pulley 30 (see Fig. III). The clutch shoes 42 are pivoted at 43 to the spider 44 which is secured to the shaft 32. Frictional engagement of the shoes 42 with the pulley 30 causes the shaft 32 to rotate with the pulley as a unit and drive the machine at high speed. The wedges 41 engage rollers 45 which are rotatably mounted in the clutch shoes 42. The clutch levers 39 are provided with rollers 46 coacting with the cone 38. These rollers 46 are mounted on the supports 47 which are pivoted on the levers 39 and adjusted by means of adjusting screws 48. Tension springs 49 connecting the levers 39, and similar springs 50 connecting oppositely disposed clutch shoes, tend to pull the latter out of engagement with the pulley.

The cone 38 is shifted by a yoke 52 which is pivoted at 53 on the bracket 37 and carries a pin 54 engaging an annular groove in the cone 38. The yoke 52 is rocked by a slide control bar 55 which is reciprocatable in guides in the brackets 36 and 37.

When the cone 38 has moved to the position shown in Fig. IX, the clutch shoes 42 are disengaged from the pulley 30, thereby permitting the latter to rotate idly and allowing the machine to stop.

When the yoke 52 and cone 38 are in the position shown by dotted lines in Fig. II, the slide bar 55 has been moved outwardly far enough to cause a rack 56 to rotate a pinion 57 a sufficient amount to cause oppositely disposed threads on the pinion shaft 58 running in nuts 59 (see Fig. IV) to contract brake shoes 60 upon a clutch drum 61. A gear 62 on the clutch drum coacts with planetary pinions 63 on a spider 64 which is keyed to the driven shaft 32. Another gear 65 which is secured to the drive pulley 30 also coacts with the planetary pinions 63. Engagement of the brake shoes 60 with the drum 61 stops rotation of the drum and compels the spider 64 to rotate the shaft 32 at half the speed of the pulley. The machine is now being driven at low speed. The brake shoes 60 are normally held out of engagement by springs 66 (see Fig. IV). Spring detents 67 are provided to hold the nuts 59 in adjustment.

The transmission is manually adjusted by a hand lever 68 which is pivoted to the housing 23 at 69 and connected to the slide bar 55 by a link 70. In addition, the transmission may automatically be thrown into neutral by the following described means:

A double cylinder 72 is attached to the transmission control slide bar 55 and contains oppositely disposed pistons 73 and 74 (see Fig. VI). A block or abutment 75 secured to a stationary part of the machine is in line with tappet rods 76 carried by the pistons. When the slide bar 55 is moved into position to cause engagement of the transmission in either speed, one of the pistons is caused to occupy a position near the end of the cylinder on account of its tappet striking the abutment 75. Thus in Fig. VI the slide bar 55 and the cylinder 72 have been moved to the right to engage the high speed clutch, the piston 73 remaining stationary. Movement of the slide bar 55 to low speed position would move the opposite end of the cylinder toward the other piston 74.

Compressed air from any suitable source of supply may be admitted simultaneously to both ends of the cylinder through passages 78, the admission being controlled by a suitable valve. The form of valve illustrated consists of a hollow piston 79 (see Figs. VII and VIII) reciprocating in the cylindrical valve chamber 80 and having an annular recess 81 formed with ends of equal area to equalize the pressure, thus preventing the pressure from aiding or opposing any movement of the valve piston. The valve piston 79 is normally held in closed position (see Fig. VII) by the coiled spring 82 in which position admission port 83 is shut off from the annular recess 81 into which the supply of compressed air is received. The air is preferably conducted to the valve through a flexible tube 84 to permit movement of the cylinder 72.

A solenoid magnet 85 is built around one end of the valve cylinder 80 in such a position that the valve 79 serves as an armature of the solenoid magnet. When an electrical current is passed through the solenoid magnet, the valve 79 is pulled to the position shown in Fig. VIII uncovering the admission port 83 and allowing compressed air to flow from the annular space 81 into both ends of the cylinder 72. Admission of air to the cylinder 72 tends to force the pistons 73 and 74 toward the middle of the cylinder. If one of the pistons has its tappet in contact with the abutment 75 (see Fig. VI), the entire cylinder must move to allow centralizing of the pistons thus carrying the slide bar 55 to neutral position (see Fig. IX). A cylindrical stop 87 secured centrally within the cylinder 72 assures its stopping at the proper position to neutralize the transmission.

When the valve piston 79 is in closed position (Fig. VII) the admission port 83 registers with one or more port holes 88 in the wall of the piston. This provides an outlet for any air that may be displaced due to movement of the cylinder 72 in relation to either piston 73 or 74, the air being finally exhausted through ports 89 in the end of the valve casing. Ports 90 in the other end of the valve cylinder prevent the movements of the piston 79 from causing either a vacuum or a compression.

The solenoid magnet 85 may be electrically connected with any number of circuit closing means located at various points on the machine. Several different devices for closing a control circuit are shown in my said co-pending application, Serial No. 595,995. I deem it sufficient in my present embodiment to illustrate and describe the operation of one of such circuit closing means.

The wire 20 is supplied to the machine in bales containing a limited amount of wire, making necessary the occasional replenishment of wire and rethreading of the machine. It is desirable that the machine be stopped as soon as the last end of the wire has passed the feed rollers 21.

When wire is in place in the machine a roller 91 mounted on a rock arm 92 is supported on the wire 20 between a guide roller 93 and guide 94 (see Figs. I, X and XI). The rock arm 92 is secured to a rock shaft 95 which is rotatable in bearings 96 secured to the housing 23. An insulated block 98 also secured to the rock shaft 95 carries a contact point 99 which coacts with another contact point 100 on the housing 23. The contact 99 is connected by a conductor 101 with the solenoid magnet 85. Whenever the roller 91 is supported by wire in the machine the contact 99 is held away from the contact 100 (see Fig. XII). When the supply of wire becomes exhausted, the roller 91 and rock arm 92 are allowed to fall (see Fig. XIII) and swing the contact 99 against the contact 100 (see Fig. XIV).

The solenoid magnet 85 is also connected with a generator 103 or other source of electricity. In the drawing I have shown a generator driven by a belt 104, the generator being independent of the change speed transmission and therefore running at a constant speed. The complete electrical circuit is shown diagrammatically in Fig. XV, the machine forming a ground for the circuit. Whenever the roller 91 is held up by wire in the machine the circuit is open. When exhaustion of the wire supply allows the contact point 99 to make contact with the point 100 the circuit is closed, permitting the generator 103 to energize the solenoid magnet 85 thereby causing admission of compressed air to the cylinder 72 to throw the transmission into neutral and stop the machine.

It is desirable that an automatic circuit breaker be included in the electrical circuit to allow the air valve to close as soon as the compressed air has completed its work and also to protect the solenoid magnet from possible injury caused by continued flow of current.

One form of automatic circuit breaker adapted to the control mechanism is illustrated in detail in Figs. XVI and XVII. When the transmission is engaged in either high or low speed an electrical terminal 105 mounted on a stationary part of the machine and insulated therefrom is electrically connected by a contact 106 to a contact plate 107 which carries another terminal 108 (see Fig. XV). The contact plate 107 is supported by an insulating block 109 which is carried by the slide bar 55. When the slide bar 55 is moved to neutral position a portion of the insulating block 109 is brought into engagement with the contact 106, thereby breaking the electrical connection between the terminals 105 and 108 (see Figs. IX and XVII).

Having thus described my invention what I claim as new and desire to secure by Letters Patent is:

1. The combination of a driven shaft, a driving pulley rotatable on said shaft, a clutch for connecting said pulley to said shaft, a driving connection for said pulley to said shaft comprising a drum, brake shoes coacting with said drum, an adjusting screw for said brake shoes provided with a pinion, a reciprocating control bar provided with a rack coacting with said pinion and operatively connected to said pulley clutch, a cylinder mounted on said control bar and provided with a passage opening to the ends thereof, pistons disposed in said cylinder and provided with inwardly projecting tappets, a fixed abutment projecting into said cylinder between said tappets, a stop limiting the inward movement of said pistons, a valve controlling the admission of air to said cylinder passage, an electromagnet for actuating said valve, and means connected to said bar for manually shifting the same.

2. The combination of a driven shaft, a driving pulley rotatable on said shaft, a clutch for connecting said pulley to said shaft, a driving connection for said pulley to said shaft comprising a drum, brake shoes coacting with said drum, an adjusting screw for said brake shoes provided with a pinion, a reciprocating control bar provided with a rack coacting with said pinion and operatively connected to said pulley clutch, a cylinder mounted on said control bar and provided with a passage opening to the ends thereof, pistons disposed in said cylinder and provided with inwardly projecting tappets, a fixed abutment projecting into said cylinder between said tappets, a stop limiting the inward movement of said pistons, and a control valve for said cylinder passage.

3. The combination of a driven shaft, a driving pulley rotatable on said shaft, a clutch for connecting said pulley to said shaft, a driving connection for said pulley to said shaft comprising a drum, brake shoes coacting with said drum, an adjusting screw for said brake shoes provided with a pinion, a reciprocating control bar provided with a rack coacting with said pinion and operatively connected to said pulley clutch, a double ended cylinder mounted on said control bar, pistons disposed in said cylinder, a fixed abutment with which both of said pistons are adapted to coact, a valve connected to admit air to both ends of said cylinder simultaneously, an electromagnet for actuating said valve, and means connected to said bar for manually shifting the same.

4. The combination of a driven shaft, a driving pulley rotatable on said shaft, a clutch for connecting said pulley to said shaft, a driving connection for said pulley to said shaft comprising a drum, brake shoes coacting with said drum, an adjusting screw for said brake shoes provided with a pinion, a reciprocating control bar provided with a rack coacting with said pinion and operatively connected to said pulley clutch, a double ended cylinder mounted on said control bar, pistons disposed in said cylinder, a fixed abutment with which both of said pistons are adapted to coact, and a control valve for said cylinder.

5. The combination of a driven shaft, a driving pulley rotatable on said shaft, a clutch for connecting said pulley to said shaft, a driving connection for said pulley to said shaft, an actuating means for said driving connection, a control bar operatively connected to said clutch and to said driving connection actuating means, a cylinder mounted on said control bar and provided with a passage opening to the ends thereof, pistons disposed in said cylinder and provided with inwardly projecting tappets, a fixed abutment projecting into said cylinder between said tappets, a stop limiting the inward movement of said pistons, a valve controlling the admission of air to said cylinder passage, an electromagnet for actuating said valve, and means connected to said bar for manually shifting the same.

6. The combination of a driven shaft, a driving pulley rotatable on said shaft, a clutch for connecting said pulley to said shaft, a driving connection for said pulley to said shaft, an actuating means for said driving connection, a control bar operatively connected to said clutch and to said driving connection actuating means, a cylinder mounted on said control bar and provided with a passage opening to the ends thereof, pistons disposed in said cylinder and provided with inwardly projecting tappets, a fixed abutment projecting into said cylinder between said tappets, a stop limiting the inward movement of said pistons, and a control valve for said cylinder passage.

7. The combination of a driven shaft, a driving pulley rotatable on said shaft, a clutch for connecting said pulley to said shaft, a driving connection for said pulley to said shaft, an actuating means for said driving connection, a control bar operatively connected to said clutch and to said driving connection actuating means, a cylinder mounted on said control bar, pistons disposed in said cylinder, a fixed abutment for said pistons, a stop limiting the inward movement of said pistons, a valve controlling the admission of air to said cylinder, and an electromagnet for actuating said valve.

8. The combination of a driven shaft, a driving pulley rotatable on said shaft, a clutch for connecting said pulley to said shaft, a driving connection for said pulley to said shaft, an actuating means for said driving connection, a control bar operatively connected to said clutch and to said driving connection actuating means, a cylinder mounted on said control bar, pistons disposed in said cylinder, a fixed abutment for said pistons, and a control valve for said cylinder.

9. The combination of a variable speed driving means, a control member operatively associated therewith arranged so that the driving mechanism is brought to neutral when the control member is in an intermediate position, a cylinder mounted on said control member and provided with passages opening to the ends thereof, pistons disposed in said cylinder and provided with inwardly projecting tappets, a fixed abutment projecting into said cylinder between said tappets, a stop within said cylinder limiting the inward movement of said pistons, and a valve controlling the admission of the air to said cylinder passages.

10. The combination of a variable speed driving means, a control member operatively associated therewith arranged so that the driving mechanism is in neutral when the control member is in an intermediate position, a cylinder mounted on said control member, pistons disposed within said cylinder, an abutment with which both of said pistons are adapted to coact, a valve connected to admit air simultaneously to both ends of said cylinder, and an electromagnet for actuating said valve.

11. The combination of a variable speed driving means, a control member operatively associated therewith arranged so that the driving mechanism is in neutral when the control member is in an intermediate position, a cylinder mounted on said control member, pistons disposed within said cylinder, an abutment with which both of said pistons are adapted to coact, and a valve connected to admit air simultaneously to both ends of said cylinder.

12. The combination of a variable speed driving means, a control member operatively associated therewith arranged so that the driving mechanism is in neutral when the control member is in an intermediate position, a cylinder mounted on said control member, pistons disposed within said cylinder, an abutment with which both of said pistons are adapted to coact, and an electromechanical means for controlling the simultaneous admission of air to the ends of said cylinder.

13. The combination of a variable speed driving means, a control member operatively associated therewith arranged so that the driving mechanism is in neutral when the control member is in an intermediate position, a cylinder mounted on said control member, pistons disposed within said cylinder, an abutment with which both of said pistons are adapted to coact, and means for controlling the simultaneous admission of air to the ends of said cylinder.

14. The combination of a driving means, a control member operatively associated therewith, a cylinder mounted on said control member, pistons disposed within said cylinder, an abutment with which both of said pistons are adapted to coact, and an electro-mechanical means for controlling the simultaneous admission of air to the ends of said cylinder.

15. The combination of a driving means, a control member operatively associated therewith, a cylinder mounted on said control member, pistons disposed within said cylinder, an abutment with which both of said pistons are adapted to coact, and means for controlling the simultaneous admission of air to the ends of said cylinder.

In witness whereof, I have hereunto set my hand.

BERT L. VAN ORMAN.